United States Patent
Acher et al.

(10) Patent No.: US 9,736,389 B2
(45) Date of Patent: Aug. 15, 2017

(54) DEVICE AND METHOD FOR CHARACTERIZING A SAMPLE USING LOCALIZED MEASUREMENTS

(71) Applicant: HORIBA JOBIN YVON SAS, Longjumeau (FR)

(72) Inventors: Olivier Acher, Gif-sur-Yvette (FR); Alexander Podzorov, Orsay (FR)

(73) Assignee: HORIBA JOBIN YVON SAS, Longjumeau (FR)

(*) Notice: Subject to any disclaimer, the term of this patent is extended or adjusted under 35 U.S.C. 154(b) by 261 days.

(21) Appl. No.: 14/416,741

(22) PCT Filed: Jul. 25, 2013

(86) PCT No.: PCT/FR2013/051802
§ 371 (c)(1),
(2) Date: Jan. 23, 2015

(87) PCT Pub. No.: WO2014/016526
PCT Pub. Date: Jan. 30, 2014

(65) Prior Publication Data
US 2015/0201117 A1  Jul. 16, 2015

(30) Foreign Application Priority Data

Jul. 27, 2012 (FR) .................... 12 57331

(51) Int. Cl.
*H04N 7/18* (2006.01)
*H04N 5/235* (2006.01)
*G01Q 40/00* (2010.01)
*G02B 21/36* (2006.01)

(52) U.S. Cl.
CPC ........... *H04N 5/2354* (2013.01); *G01Q 40/00* (2013.01); *G02B 21/365* (2013.01)

(58) Field of Classification Search
None
See application file for complete search history.

(56) References Cited

U.S. PATENT DOCUMENTS 5,117,110 A    5/1992   Yasutake
7,630,628 B2  12/2009  Ogihara

FOREIGN PATENT DOCUMENTS

WO    2009106602 A1    9/2009

OTHER PUBLICATIONS

International Search Report, dated Sep. 26, 2013, from corresponding PCT application.

*Primary Examiner* — Dakshesh Parikh
(74) *Attorney, Agent, or Firm* — Young & Thompson

(57) ABSTRACT

Device for characterizing a sample includes a measuring instrument for determining a physical characteristic of the sample at one point thereof; a positioning system for positioning the measuring instrument relative to the sample, to obtain a measurement at a point localized on the sample. The positioning system includes: a locating target connected to the sample and defining a reference system linked thereto; elements for acquiring and analyzing images, including lighting elements for illuminating the target; an optical imaging system connected to the measuring instrument for acquiring an image of at least one portion of the target; and image analysis elements for analyzing the image to determine the position and orientation of the optical imaging system relative to the target; calibration elements for determining the position of the measuring instrument relative to the optical imaging system; and processing elements for processing the results of the image analysis and of the calibration.

27 Claims, 7 Drawing Sheets

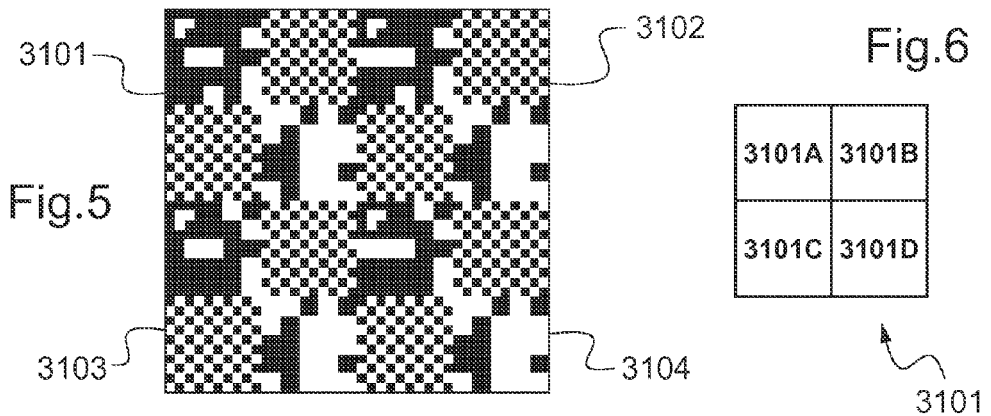
Fig.5
Fig.6
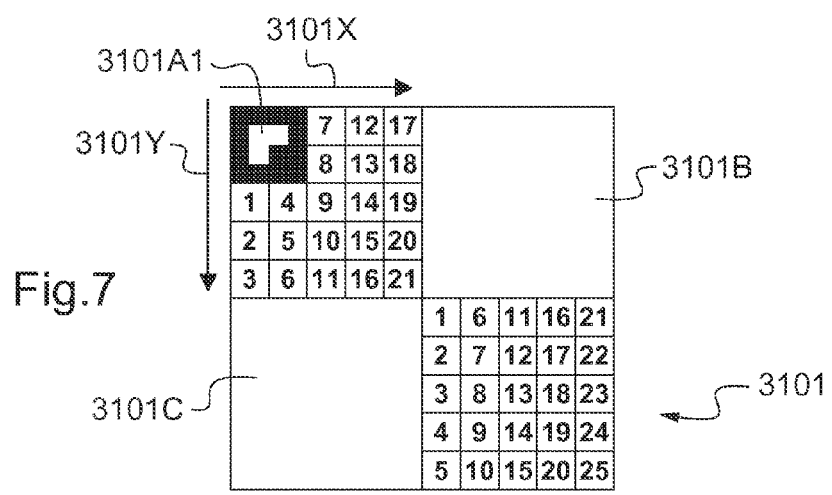
Fig.7
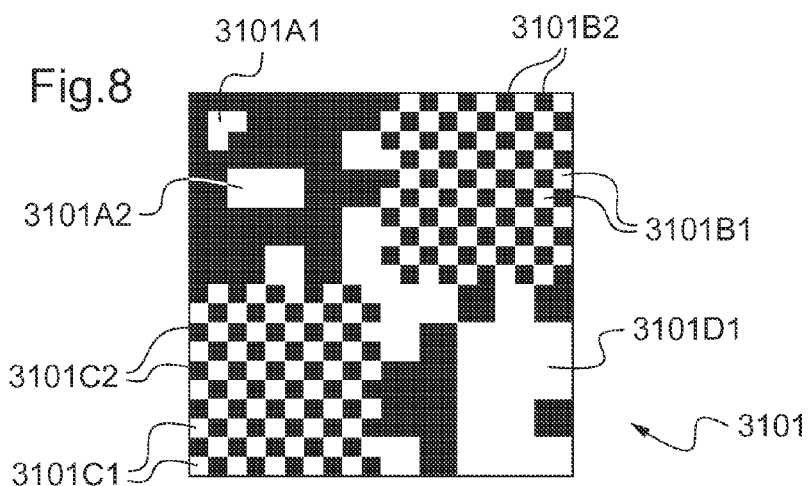
Fig.8

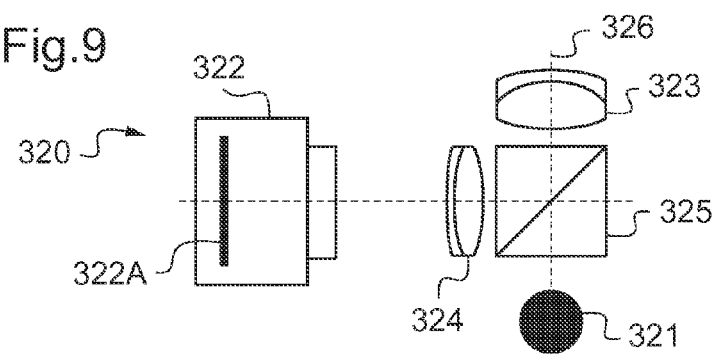
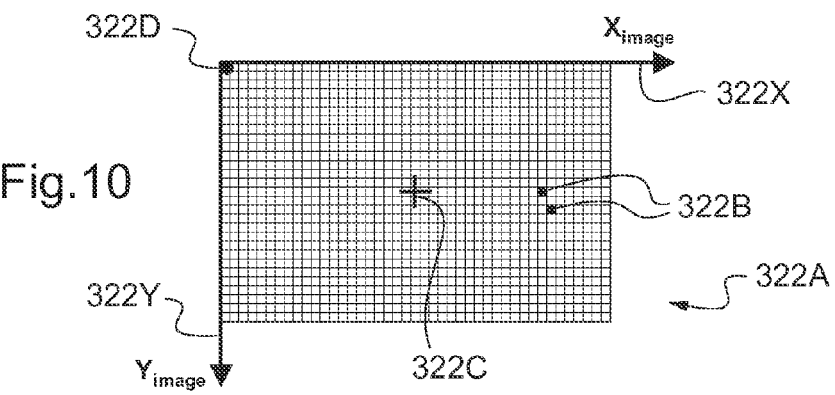
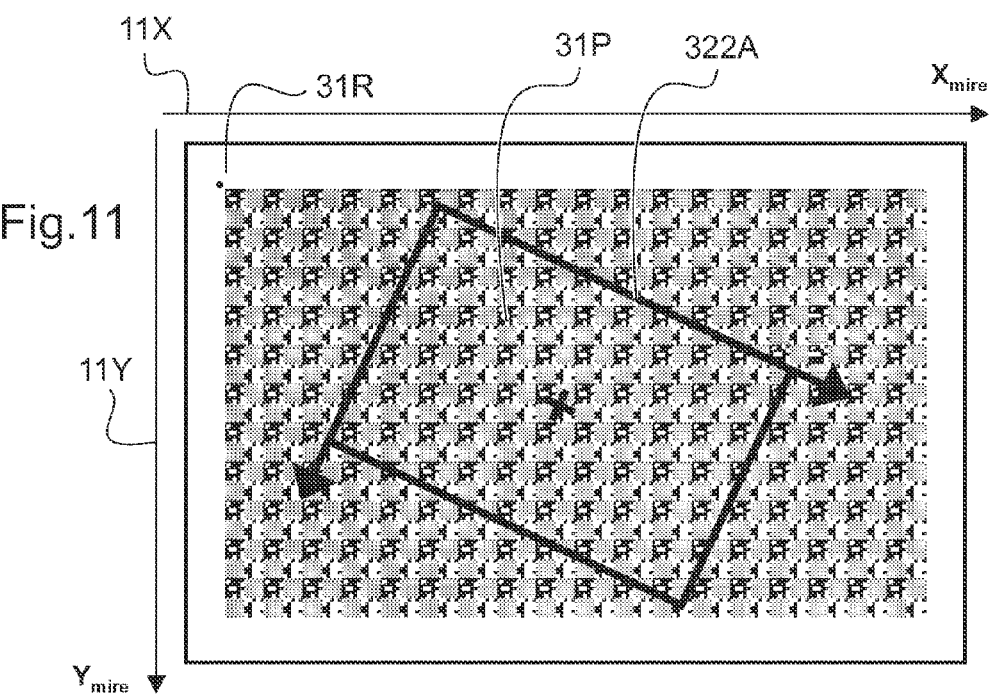

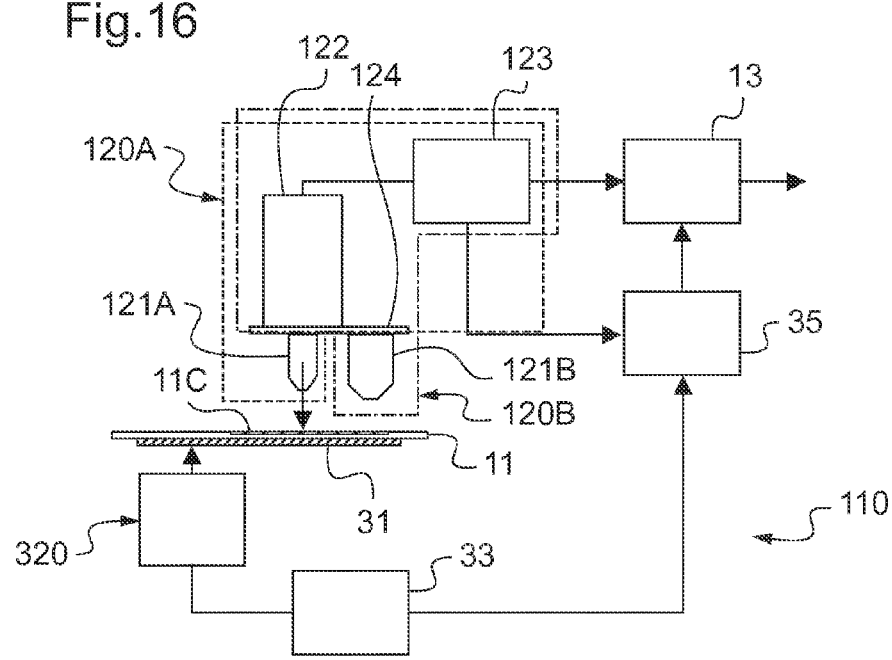
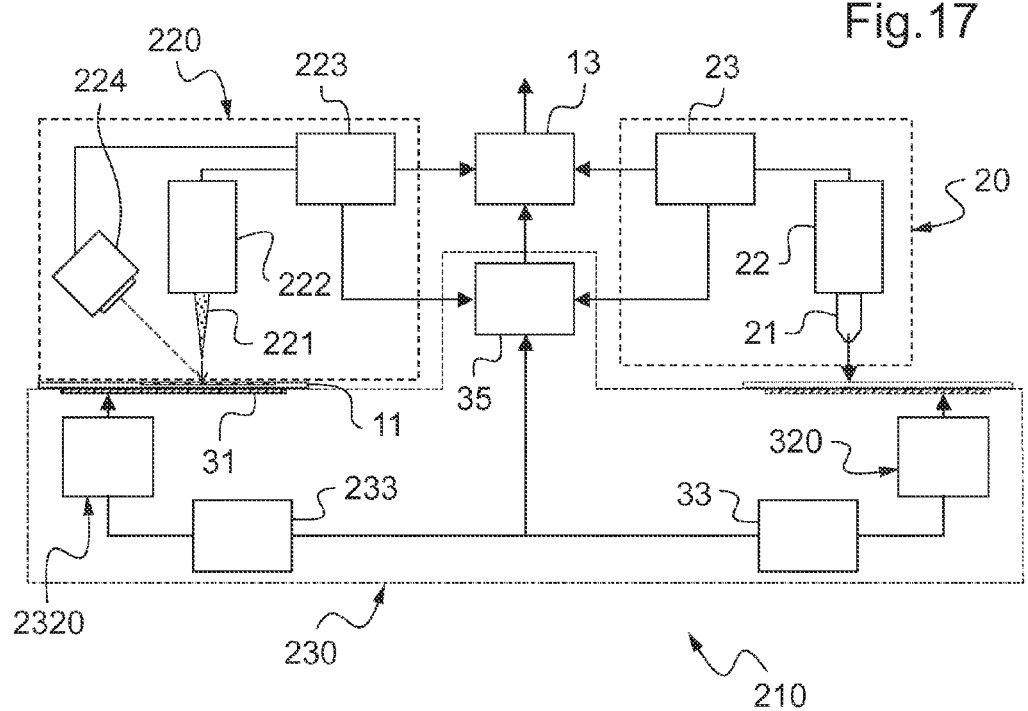

DEVICE AND METHOD FOR CHARACTERIZING A SAMPLE USING LOCALIZED MEASUREMENTS

BACKGROUND OF THE INVENTION

The invention relates to a characterization device intended to measure a physical characteristic of a sample.

The invention more particularly relates to a characterization device including at least a measuring instrument and a positioning system allowing to position in an absolute manner the measuring instrument in relation to the sample.

The invention also relates to a characterization device including two measuring instruments, the positioning system allowing to perform co-localized measurements on the sample by means of the two measuring instruments.

With the coming of nanotechnologies, the capacity to perform extremely accurate measurements in order to control the manufacturing, the operation and the ageing of different components at the nanometer scale has become essential. A recurrent problem is then the "co-localization" of the measurements performed with different measuring instruments or at different instants of time.

By co-localization of the measurements, it is meant the possibility to perform different measurements at the same places of a sample.

The co-localization of measurements requires, on the one hand, a high spatial accuracy, i.e. the measuring instrument has to be very accurately positioned in relation to a sample to be characterized during a punctual measurement.

On the other hand, it requires a high repeatability of the measurements. It is indeed essential to be able to perform the same measurement at different instants and to find the same result for a stable sample.

It is known in the field of metrology that a sample characterization device includes a measuring instrument adapted to determine a physical characteristic of this sample at one point of the latter.

When using such a characterization device, it is useful to correctly place the sample in relation to the measuring instrument so as to perform the measurement at one particular point of the sample.

DESCRIPTION OF THE RELATED ART

A characterization device is known, for example, from the document U.S. Pat. No. 7,630,628, which also includes a positioning system allowing to position the measuring instrument in relation to the sample to be characterized at one localized measurement point of the sample. The positioning system of the document U.S. Pat. No. 7,630,628 comprises in particular a sample carrier plate on which the sample has been placed, with piloting means for displacing this plate in an accurate and repeatable manner. This allows, if the sample is made integral with the sample carrier plate and if the sample is not handled between two measurements, to perform two measurements in two substantially identical measurement points.

However, the positioning system of the document U.S. Pat. No. 7,630,628 does not allow to accurately know the position of the measuring instrument in relation to the sample, i.e. to position in an absolute manner the measuring instrument in relation to the sample.

Moreover, a characterization device is known from the document U.S. Pat. No. 5,177,110, which includes a positioning system allowing to accurately position the measuring instrument above a determined point of a sample to be characterized.

The document U.S. Pat. No. 5,177,110 discloses a characterization device in which the position system, herein formed of an optical microscope, is used in a first time, and the measuring instrument, including a scanning tunneling microscope, in a second time. The positioning and measurement operations are hence not performed simultaneously.

One of the objects of the invention is to make so that measurements at the nanometer scale are co-localizable for a great variety of measuring instruments, hence performing a multimodal characterization of a sample, i.e. analysing the latter by different techniques.

SUMMARY OF THE INVENTION

To remedy the above-mentioned drawback of the prior art, the present invention proposes a device for characterizing a sample, allowing to position in an absolute manner a measuring instrument in relation to the sample.

For that purpose, the invention relates to a device for characterizing a sample including:
  a measuring instrument adapted to determine a physical characteristic of said sample at one point of said sample, and
  a positioning system adapted to position said measuring instrument in relation to said sample to be characterized, at one localized measurement point of said sample,
  characterized in that said positioning system comprises:
  a localization target made integral with said sample and defining a referential system linked to said sample,
  image acquisition and analysis means including:
    means for illuminating said localization target;
    an optical imaging system, integral with said measuring instrument, adapted to acquire an image of at least one portion of said localization target, and
    image analysis means adapted to analyse the image of said portion of the localization target to determine the position and orientation of said optical imaging system in relation to said localization target,
  calibration means adapted to determine the relative position of said measuring instrument in relation to said optical imaging system, and
  means for processing the results of the image analysis and of the calibration, adapted to determine the absolute position of said localized measurement point in said referential system linked to said sample, said measuring instrument being positioned for the measurement at said localized measurement point and said physical characteristic of said sample being determined by said measuring instrument at said localized measurement point.

The characterization device according to the invention hence allows, thanks to its positioning system, to locate the localized measurement point of said sample in a referential system linked to the sample.

Indeed, the acquisition and analysis of the image of a portion at least of the localization target by the image acquisition and analysis means of the positioning system allows to know accurately what are the position and orientation of the optical imaging system in relation to the localization target, and hence in relation to the sample, the localization target being made integral with the sample.

By determining moreover, thanks to the calibration means, the relative position of the measuring instrument in relation to the optical imaging system, i.e. the position of the measuring instrument in a referential system linked to the optical imaging system, the positioning system can determine, when the measuring instrument is positioned for the measurement at said localized measurement point, what is the absolute position of the localized measurement point in a referential system linked to the sample.

Thanks to the characterization device according to the invention, neither the sample to be characterized, nor the localization target, are moved between the moment where the position of the localized measurement point is determined by the positioning system, and the moment where the measurement of the sample is made by the measuring instrument. The positioning and sample measurement operations are hence performed simultaneously.

The positioning system allows to position the measuring instrument at any localized measurement point of the sample by reading the corresponding position on the localization target. The characterization device hence allows to make an accurate cartography of a portion or the totality of the sample to be characterized.

Moreover, the characterization device according to the invention allows to perform with the measuring instrument two time-separated measurements on a sample, and that at the same localized measurement point, even if the sample has been displaced in relation to the measuring instrument between the two successive measurements.

The characterization device according to the invention is more particularly adapted to the case where it is desired to characterize a same sample by two different measuring instruments, whether these two measuring instruments perform a measurement at a same localized measurement point or at two distinct localized measurement points.

Hence, the invention also relates to:
- a characterization device including another measuring instrument adapted to determine another physical characteristic of said sample at one point of said sample, said positioning system being adapted to position said other measuring instrument in relation to said sample at a second localized measurement point of said sample, said optical imaging system being also integral with said other measuring instrument, said calibration means of said positioning system being adapted to determine the relative position of said other measuring instrument in relation to said optical imaging system, and said result processing means being adapted to determine the absolute position of said second localized measurement point in said referential system linked to said sample, said other physical characteristics of said sample being determined by said other measuring instrument at said second measurement point;
- a characterization device including another measuring instrument adapted to determine another physical characteristic of said sample at one point of said sample, said positioning system being adapted to position said other measuring instrument in relation to said sample at a second localized measurement point of said sample and comprising another optical imaging system, integral with said other measuring instrument, adapted to acquire another image of at least one portion of said localization target, said image analysis means being adapted to analyse said other image of the portion of said localization target to determine the position and orientation of said other optical image system in relation to said localization target, said calibration means of said positioning system being adapted to determine the relative position of said other measuring instrument in relation to said other optical imaging system, and said result processing means being adapted to determine the absolute position of said second localized measurement point in said referential system linked to said sample, said other physical characteristic of said sample being determined by said other measuring instrument at said second measurement point, and
- a characterization device including another measuring instrument adapted to determine another physical characteristic of said sample at one point of said sample, said positioning system being adapted to position said other measuring instrument in relation to said sample at a second localized measurement point of said sample and comprising:
  - another optical imaging system, integral with said other measuring instrument, adapted to acquire another image of at least one portion of said localization target, said image analysis means being adapted to analyse said other image of the portion of the localization target to determine the position and orientation of said other optical imaging system in relation to said localization target, and
  - other calibration means adapted to determine the relative position of said other measuring instrument in relation to said other optical imaging system, said result processing means being adapted to determine the absolute position of said second localized measurement point in said referential system linked to said sample, said other physical characteristic of said sample being determined by said other measuring instrument at said second measurement point.

Hence, the characterization device has for advantage to propose a positioning system allowing to make many measuring instruments compliant with each other.

Such characterization devices may be used to perform co-localized measurements at the same place or at distinct places on the sample with different measuring instruments, separated in space and/or in time.

The characterization device hence allows to couple virtually different techniques of measurement implemented in different measuring instruments. This fulfils a need to perform multimodal studies on samples.

Furthermore, the characterization device may in particular include a measuring instrument determining, during a single measurement, said physical characteristic of the sample on an extended area substantially centred about said localized measurement point.

Among the measuring instruments that can be used in a characterization device as described above, it may be mentioned, for example, the following measuring instruments:
- wide-field or laser-scanning (confocal microscope), contrasting absorption, reflexion, elastic scattering or Raman, phase, interference, polarization or fluorescence digital optical microscope in the visible, ultraviolet and infrared regions;
- local probe microscope (for example, an atomic force microscope);
- scanning, transmission or scanning transmission electron microscope, Auger spectrometer, X photoelectron spectrometer;
- mechanical profilometer;
- surface plasmon resonance imaging system;
- mass spectrometer;
- X-ray absorption or fluorescence spectrometer;
- cathodoluminescence spectrometer.

Moreover, other advantageous and non-limitative characteristics of the characterization device are as follows:

said localization target is engraved on or in the sample through mechanical or photolithographic techniques, or is printed on the sample by inking or serigraphy;

said localization target comprises a flexible or rigid support added on the sample to make the support integral with said sample;

said localization target is formed of an adhesive sheet;

said localization target is made integral with the second face of a substantially planar sample including a first face and a second face, said localized measurement point being located on said first face of said sample;

said localization target extends spatially over a localization area that is greater than a measurement area of said sample intended to be characterized by said measuring instrument;

said localization target extends over the whole second face of said sample;

said localization target is manufactured simultaneously with said sample;

said localization target includes micro- or nanostructured patterns;

said localization target is formed of a plurality of elementary cells forming a regular two-dimensional pavement;

each elementary cell includes a positioning pattern indicating the position of said elementary cell in said referential system linked to said sample, and an orientation pattern indicating the orientation of said elementary cell in said referential system linked to said sample;

each elementary cell includes periodic patterns allowing to improve the accuracy of positioning of said elementary cell in relation to said sample;

each elementary cell includes an identification pattern coding information relating to said sample and/or said localization target;

said identification pattern is identical for each of said elementary cells;

said optical imaging system is arranged in such a manner that said image of the portion of said localization target includes an image of said periodic patterns;

said optical imaging system is arranged in such a manner that said image of the portion of the localization target includes an image of said identification pattern.

The use of a localization target having micro- or nanostructured patterns allows to reach an accuracy of positioning of the measuring instrument in relation to the sample lower than 0.1 micrometer (µm). This reveals particularly advantageous, particularly for measuring instruments of the Raman microspectrometer, atomic force microscope or electron microscope type, for example.

The invention especially relates to a device for characterizing a substantially planar sample including a first face and a second face, in which:

said measuring instrument includes an optical microscope that comprises a place intended to receive a condenser when said optical microscope is used in trans-illumination mode;

said localization target is made integral with said second face of said sample, said localized measurement point being located on said first face of said sample, and said optical imaging system is arranged at the place of said condenser.

The invention finally relates to a method for characterizing a sample, by means of a measuring instrument adapted to determine a physical characteristic at one point of said sample, including steps consisting in:

a) determining the relative position of said measuring instrument in relation to an optical imaging system, integral with said measuring instrument, b) placing the sample to be characterized in such conditions to be measured by said measuring instrument at one localized measurement point of said sample, wherein a localization target has been made integral with said sample, said target defining a referential system linked to said sample;

c) illuminating said localization target and acquiring, by means of said optical imaging system, an image of at least one portion of said localization target, d) determining, from the analysis of the image of said portion of the localization target, the position and orientation of said optical imaging system in relation to said localization target, and e) deducing from steps a) and d) the absolute position of said localized measurement point in said referential system linked to said sample, when said measuring instrument is positioned for the measurement at said localized measurement point, so as to determine said physical characteristic of said sample by said measuring instrument at said localized measurement point.

BRIEF DESCRIPTION OF THE DRAWING FIGURES

Embodiments of the invention will be described in detail with reference to the drawings, in which:

FIG. 5 is a detail view of four elementary cells of FIG. 4 including micro-structured patterns;

FIG. 6 is a schematic view of an elementary cell of FIG. 5;

FIG. 7 shows a schematic view of the elementary cell of FIG. 6 indicating how some information is coded in two areas of this elementary cell;

FIG. 8 is a detail view of the elementary cell of FIG. 6;

FIG. 9 is a schematic view of a target imaging system including an optical imaging system and illumination means;

FIG. 10 is a schematic view of an array of detectors and of an associated image-reference system;

FIG. 11 is a schematic view of an image of the localization target of FIG. 4, a portion of which is acquired by the array of detectors of FIG. 10;

FIG. 16 is a schematic view of a second embodiment of the characterization device including an optical microscope equipped with two lenses;

FIG. 17 is a schematic view of a third embodiment of the characterization device including an atomic force microscope and an optical microscope.

DETAILED DESCRIPTION OF THE INVENTION

Figure 1:
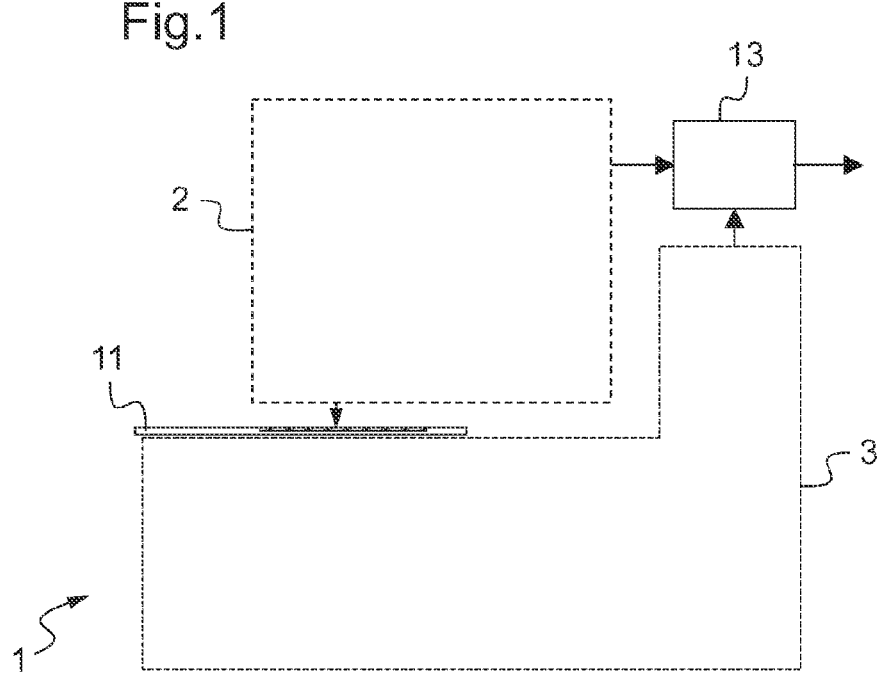
FIG. 1 is a schematic view of a characterization device including a measuring instrument and a positioning system.

FIG. 1 shows a schematic view of a characterization device 1 including a measuring instrument 2 and a positioning system 3. The characterization device 1 of FIG. 1 serves to characterize a sample 11 placed in the device.

The measuring instrument 2 allows to determine a physical characteristic of the sample 11 at one point of the latter.

The positioning system 3 allows to position the measuring instrument 2 in relation to the sample 11 to be characterized, the measuring instrument 2 performing the measurement of the physical characteristic at one localized measurement point of the sample 11.

The characterization device 1 of FIG. 1 also includes means 13 for processing the results of the image analysis and of the calibration that deduce, based on information received from the measuring instrument 2 and from the positioning system 3, the absolute position of the localized measurement point in a referential system linked to the sample 11. The physical characteristic of the sample 11 is hence determined by the measuring instrument 2 at the localized measurement point.

Figure 2:
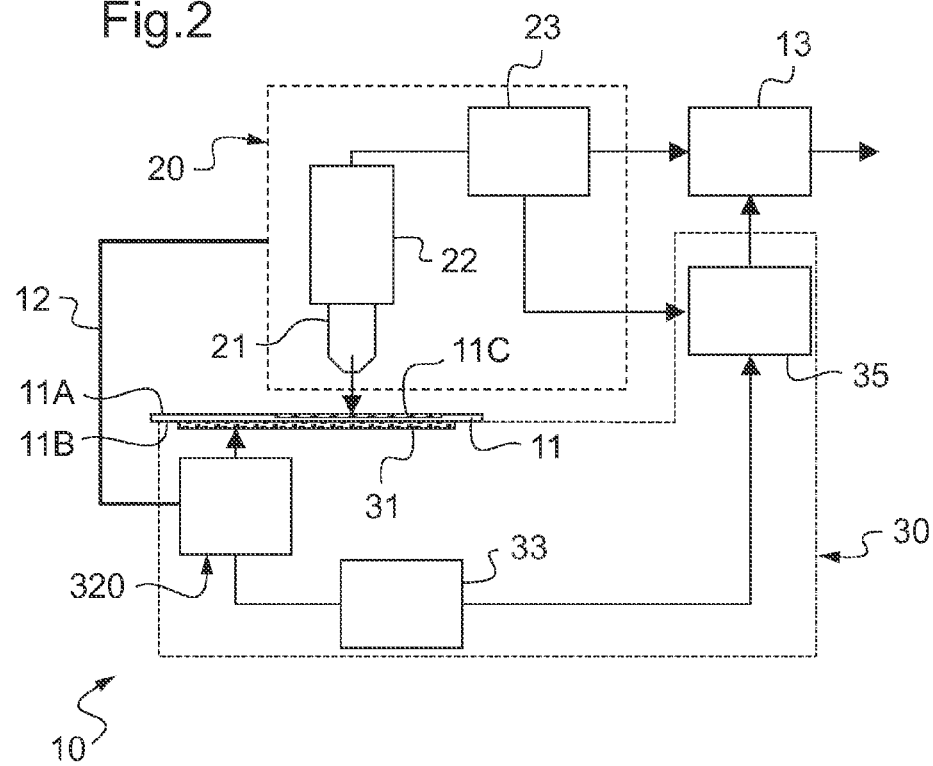
FIG. 2 is a schematic view of a first embodiment of the characterization device including an optical microscope as a measuring instrument.

In FIGS. 2, 16 and 17 are shown different embodiments of a characterization device 10, 110, 210 intended for the characterization of the sample 11.

This sample 11 is consisted of a piece of a silicon wafer having an area of interest 11C in which are engraved microelectronic circuits.

The sample 11 is substantially planar and has a first face 11A and a second face 11B.

Hereinafter, the first face 11A will be called the upper face and the second face 11B the lower face.

The upper face 11A is the face of the sample 11 on which are performed the measurements performed by the different characterization devices 10, 110, 210.

The sample 11 is square-shaped and has a width of 50 millimeters (mm) and a length of 50 mm. Its thickness is herein equal to 275 micrometers (μm).

The microelectronic circuits, which are engraved on the upper face 11A of the sample 11, at the area of interest 11C, have characteristic sizes of the order of a few hundreds of nanometers (1 nm=$10^{-3}$ micrometers).

The characterization devices 10, 110, 210 of FIGS. 2, 16 and 17, respectively, each include an identical positioning system 30.

The positioning system 30 first includes a localization target 31, which is also substantially planar. The localization target 31 comprises in particular a flexible support, in the form of an adhesive sheet, added on the sample 11 to make the localization target 31 integral with the latter. By integral, it is meant that the localization target 31 does not move with respect to the sample 11 during the characterization thereof.

Advantageously, the localization target 31 has stable dimensional and physical properties at a time scale of the order of several months to a few years. The localization target 31 is preferably resistant to the effects of temperature and humidity variation under laboratory conditions, and withstands high vacuum conditions.

As a variant, the positioning system could for example include a substantially planar sample carrier, with an upper face and a lower face. In this case, the sample may be fixed on the upper face of the sample carrier and the localization target may be fixed on the lower face thereof.

The localization target 31 is in the form of an adhesive label fixed to the lower face 11B of the sample 11.

Figure 3:
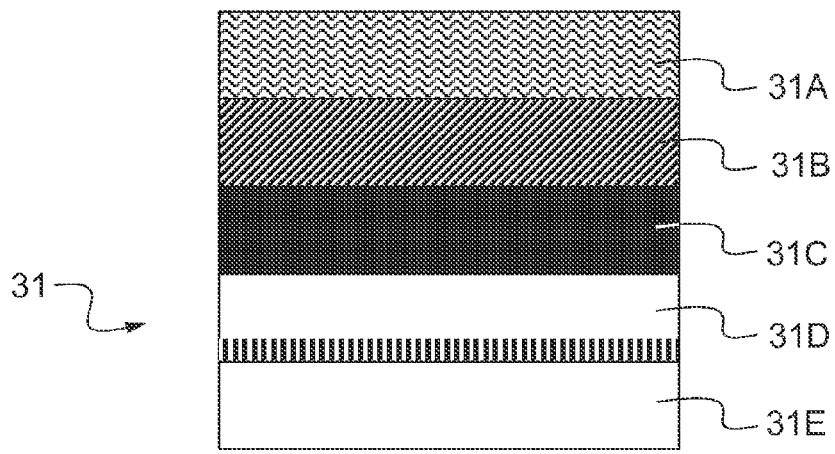
FIG. 3 shows a schematic view of the structure of a localization target added on the sample as a label.

In FIG. 3 is shown a schematic view of the cross-sectional structure of the localization target 31, with the different layers included in the adhesive label, before the latter is stuck on the sample 11.

The adhesive label includes five layers 31A, 31B, 31C, 31D and 31E, and its total thickness is herein lower than 200 μm.

The first layer 31A is formed of a protective film for the second layer 31B formed by an adhesive layer. During the sticking of the localization target 31 on the sample 11, the protective film 31A is removed so that the adhesive layer 31B can be applied, by pressure, against the lower face 11B of the sample 11. The second layer 31B may be used to stick the localization target 31 on a great number of supports such as: glass, metal, plastic, crystal, semi-conductor or ceramic. The adhesion of the adhesive layer 31B is such that the localization target 31 does not unstick from the sample 11 during the whole duration of the characterization of the sample 11 by the characterization device 10, 110, 210.

The third layer 31C is an opaque layer, optically occulting for the light in the visible region. This occulting layer 31C prevents the light from passing through the localization target 31, either by absorbing it or by reflecting it.

The fourth layer 31D is a layer including patterns and having an optical contrast allowing to encode some information in the localization target 31. The arrangement of the patterns in this optically contrasted layer 31D will be seen hereinafter.

The fifth and last layer 31E is a protective layer of the optically contrasted layer 31D. It allows to protect the fourth layer 31D during the application of the localization target 31 against the lower face 11B of the sample 11. This fifth layer 31E is optically transparent in the wavelength range for which the fourth layer 31D has an optical contrast, which allows the optically contrasted layer 31D to be visible when observed through the last layer 31E.

The fifth layer 31E is herein optically transparent for the light in the visible region.

As a variant, the localization target could be engraved on or in the sample by means of mechanical or photolithographic techniques.

As another variant, the localization target could be printed on the sample by inking or by serigraphy.

As a variant, the localization target is a glass microscope slide, on which the patterns are made by photolithography, the sample being applied and/or stuck on the slide.

Figure 4:
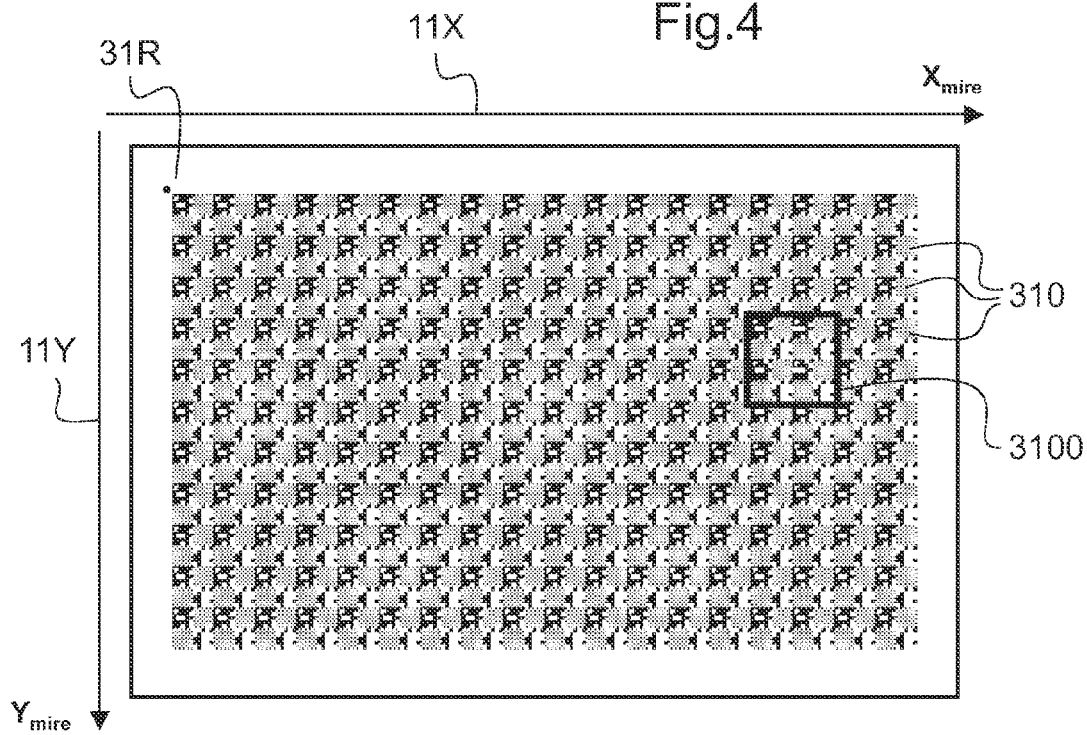
FIG. 4 is a schematic view of a sample including on its lower face a localization target having a regular arrangement of elementary cells.

In FIG. 4 is shown a schematic bottom view of the sample 11, making appear the lower face 11B of the sample 11 as well as the localization target 31 that is stuck thereon. The localization target 31 extends over the major portion of the lower face 11B of the sample 11.

Advantageously, the localization target 31 extends spatially over a localization area that is greater than the area of interest 11C that constitutes a measurement area of the sample 11 intended to be characterized by the characterization device 10, 110, 210.

As a variant, the localization target could for example extend over the whole lower face of the sample.

In all the embodiments of the invention, the localization target 31 includes a lateral patterning at the micro- or nanometer scale, with micro- or nanostructured patterns. These patterns correspond to the patterns of the above-described optically contrasted layer 31D.

Hence, the localization target 31 is herein formed of a plurality of elementary cells 310 forming a regular two-dimensional pavement, in the plane of the localization target 31. The elementary cells 310 are hence periodically distributed along the two orthogonal directions 11X, 11Y, herein represented in FIG. 4 by the axes $X_{mire}$ and $Y_{mire}$ perpendicular to each other.

Moreover, the point 31R located at the top left corner (see FIG. 4) of the localization target 31 is considered. This point 31R constitutes a fixed reference point of the localization target 31, which is integral with the sample 11. This reference point 31R is hence also a point linked to the sample 11.

Hence, the reference point 31R, the axes 11X and 11Y form together a referential system 31R, 11X, 11Y linked to the sample 11, in relation to which it is possible to locate in an absolute manner any point of this sample 11.

In FIG. 5 is shown a detail view of four elementary cells 3101, 3102, 3103, 3104 of the localization target 31, these four elementary cells 3101, 3102, 3103, 3104 being those which are indicated in FIG. 4 by the black square 3100. Each elementary cell 3101, 3102, 3103, 3104 has herein a squared shape of about 200 µm side.

Preferably, each elementary cell 3101, 3102, 3103, 3104 has dimensions along the axes 11X, 11Y comprised between 40 µm and 1 mm.

Each elementary cell 3101, 3102, 3103, 3104 includes different micro-structured patterns, whose function will be detailed hereinafter.

For that purpose, it is considered in FIG. 6 the elementary cell 3101 which is the cell located on the top left corner of the square 3100 of FIG. 5.

This elementary cell 3101 may be divided into four distinct sub-cells 3101A (sub-cell in the top left corner of the elementary cell 3101), 3101B (in the top right corner), 3101C (in the bottom left corner), and 3101D (in the bottom right corner). Each sub-cell 3101A, 3101B, 3101C, 3101D is herein square and of about 100 µm side.

Sub-Cell 3101A (FIG. 6)

The sub-cell 3101A of the elementary cell 3101 is first considered. This sub-cell 3101A may be itself subdivided into 5×5=25 sub-sub-cells, as shown in FIG. 7.

The four sub-sub-cells located in the top left corner of the sub-cell 3101A include an orientation pattern 3101A1. The orientation pattern 3101A1 has herein the shape of a right-angle square, each branch of the square having a length equal to the size of a sub-sub-cell of the sub-cell 3101A.

The shape of the orientation pattern 3101A1 provides the latter with the geometrical property that it is invariant by no rotation in the plane parallel to the plane of the localization target 31.

The orientation pattern 3101A1 is arranged in the first four sub-sub-cells so as to define two orthogonal axes 3101X and 3101Y oriented in the direction of each of the branches of the square forming the orientation pattern 3101A1. Hence, the orientation pattern 3101A1 defines an orthogonal reference system linked to the elementary cell 3101.

In the case of FIG. 7, the orthogonal axes 3101X and 3101Y are each parallel to one side of the elementary cell 3101, so that the two orthogonal axes 3101X and 3101Y are parallel to the two orthogonal axes $X_{mire}$ and $Y_{mire}$, respectively.

Hence, the orientation pattern 3101A1 indicates the orientation of the elementary cell 3101 in the referential system 31A, 11X, 11Y linked to the sample 11.

As a variant, the orientation pattern may be arranged in any way inside an elementary cell so that the reference axes defined by the orientation pattern are not parallel to the sides of the elementary cell to which it belongs.

It will be observed moreover in FIGS. 4 and 5 that each elementary cell 310, 3101, 3102, 3103, 3104 includes an identical orientation pattern, of same shape and same size, arranged and oriented in the same manner in the elementary cell 310, 3101, 3102, 3103, 3104 in which it is located.

Hence, the orthogonal reference systems defined by the orientation patterns of the elementary cells 310, 3101, 3102, 3103, 3104 are all oriented in the same manner in relation to the localization target 31. It will be noticed in particular herein that the axes 3101X and 3101Y of the elementary cell 3101 are parallel to the axes 11X and 11Y, respectively, of the localization target 31 (see FIG. 4).

The twenty-one other sub-sub-cells of the sub-cell 3101A code for a positioning pattern 3101A2, whose coding principle will be described hereinafter.

The twenty-one other sub-sub-cells of the sub-cell 3101A are numbered from 1 to 21, the numbering being performed from top to bottom, and from left to right (cf. FIG. 7).

As can be seen in FIG. 8, each sub-sub-cell can be either white (case of the sub-sub-cells #1 to 3, 5 to 8, 10, 12 to 17, and 19), or black (case of the sub-sub-cells #4, 9, 11, 18, 20, and 21). They hence form the positioning pattern 3101A2.

This positioning pattern 3101A2 indicates the position of the elementary cell 3101 in the referential system 31A, 11X, 11Y linked to the sample 11.

For that purpose, it is assigned to each of the sub-sub-cells a binary digit (or "bit"), according to the following convention:
if the sub-sub-cell is black, then the value of the bit associated with this sub-sub-cell is equal to 0;
if the sub-sub-cell is white, then the value of the bit associated with this sub-sub-cell is equal to 1.

Hence, thanks to the twenty sub-sub-cells numbered from 1 to 20, two binary numbers can be formed as follows:
a first binary number formed of the bits of the sub-sub-cells numbered from 1 (least significant bit) to 10 (most significant bit), and
a second binary number formed of the bits of the sub-sub-cells numbered from 11 (least significant bit) to 20 (most significant bit).

The first binary number codes for the position of the elementary cell 3101 along the axis 11X and the second binary number codes for the position of the elementary cell 3101 along the axis 11Y.

The bit of the 21$^{st}$ sub-sub-cell (numbered 21 in FIG. 7) is used to correct possible decoding errors. It corresponds to the sum of the first twenty bits (sub-sub-cells #1 to 20), i.e. it is equal to "1" if this sum is odd and equal to "0" if this sum is even.

As shown in FIG. 8, the positioning pattern 3101A2 of the elementary cell 3101 is such that:
the first binary number is 0100001000,
the second binary number is 1010000001, and
the 21$^{st}$ bit is equal to 1 (the sum of the first twenty bits being odd, equal to 5).

It can be noticed in FIG. 5 that the positioning pattern 3101A2 is different for each of the elementary cells 3101, 3102, 3103 and 3104, such that it codes each times for a different position of the elementary cells 3101, 3102, 3103 and 3104 in the referential system 31R, 11X, 11Y linked to the sample 11.

Sub-Cells 3101B and 3101C (FIG. 6)

In FIG. 8, it is observed that the elementary cell 3101 includes periodic patterns in each of the sub-cells 3101B and 3101C. These latter are indeed formed of a draughtboard with white squares 3101B1, 3101C1 and black squares 3101B2, 3101C2. Each draughtboard comprises ten lines (or ten columns) of ten squares alternately white or black, i.e. a total of 100 squares. Each square of the draughtboard has herein an about 10 µm side.

Preferably, the squares of the draughtboard may have dimensions comprised between 2 µm and 50 µm.

As can be seen in FIGS. 4 and 5, each elementary cell 310, 3102, 3103, 3104 comprises two sub-cells formed similarly to the two sub-cells 3101B and 3101C, i.e. they have a draughtboard structure with white squares and black squares.

It will be seen hereinafter how these periodic patterns allow to improve the accuracy of positioning of the target imaging system 320 in relation to the sample 11.

Sub-Cell 3101D (FIG. 6)

The sub-cell 3101D may be subdivided into twenty-five sub-sub-cells, as shown in FIG. 7. These sub-sub-cells are numbered from 1 to 25, the numbering being performed from top to bottom, and from left to right.

As for the sub-cell 3101A, and as can be seen in FIG. 8, each sub-sub-cell may be either white (case of the sub-sub-cells #1 and 2, 5 and 6, 12 to 20, 22, 23 and 25), or black (case of the sub-sub-cells #3 and 4, 7 to 11, 21 and 24).

The first twenty-four sub-sub-cells of the sub-cell 3101D hence form an identification pattern 3101D1 shown in FIG. 8.

The identification pattern 3101D1 of the elementary cell 3101 codes for information relating to the sample 11 and to the localization target 31.

Indeed, as for the sub-cell 3101A, one or several binary numbers are formed from the value of the bits associated with each of these sub-sub-cells of the sub-cell 3101D. It is reminded that the value of the bit is equal to 0 if the sub-sub-cell is black, or equal to 1 if the sub-sub-cell is white.

In the embodiments of the invention, the first twenty-first sub-sub-cells numbered from 1 to 24 form two binary numbers as follows:
a first binary number formed of the twelve bits of the sub-sub-cells numbered from 1 (least significant bit) to 12 (most significant bit), and
a second binary number formed of the twelve bits of the sub-sub-cells numbered from 13 (least significant bit) to 24 (most significant bit).

The first binary number herein codes for a reference of the sample 11 and the second binary number codes for the size of a square of the draughtboard of the sub-cells 3101B and 3101C.

The bit of the $25^{th}$ sub-sub-cell (numbered 25 in FIG. 7) is also used to correct possible decoding errors. It corresponds to the sum of the first twenty-four bits (sub-sub-cells #1 to 24), i.e. it is equal to 1 if this sum is odd and equal to 0 if this sum is even.

As shown in FIG. 8, the identification pattern 3101D1 of the elementary cell 3101 is such that:
the first binary number is 100000110011,
the second binary number is 011011111111, and
the $25^{th}$ bit is equal to 1 (the sum of the first twenty-four bits being odd, equal to 15).

Preferably for the three embodiments of the invention, the identification pattern 3101D1 is identical for each of the elementary cells 310 of the localization target 31. It is hence observed in FIG. 5 that the identification pattern 3101D1 is for example the same for each of the elementary cells 3101, 3102, 3103, and 3104, such that it codes each times for the same information relative to the sample 11 and to the localization target 31, herein the reference of the sample 11 and the size of a square of the draughtboard of the sub-cells B or C.

As a variant, the identification pattern could for example code for a reference of the localization target, for a scale of the elementary cell, for a code allowing to interpret correctly the information of localization of the localization target. The first twenty-four sub-sub-cells of the associated sub-cell are then used to form as many binary numbers as required.

As another variant, the identification pattern could for example be different for each of the elementary cells of the localization target.

The positioning system 30 of the characterization devices 10, 110, 210 also includes image acquisition and analysis means comprising a target imaging system 320 and image analysis means 33 herein located of the side of the lower face 11B of the sample 11. So placed, the target imaging system 320 faces the localization target 31 so as to be able to take an image of a portion of the localization target 31.

In FIG. 9 are shown the target imaging system 320 used in the three embodiments of the invention. This target imaging system 320 first includes illumination means 321 allowing to illuminate the localization target 31. These illumination means 321 herein include:
an electroluminescent diode emitting a visible or near-infrared radiation along an optical axis 326,
a splitting cube 325 transmitting the light coming from the illumination means 321 towards the localization target 31, and
a first group 323 of optical lenses allowing to collimate the light coming from the illumination means 321 to the localization target 31 and to illuminate uniformly the latter.

As a variant, when the measuring instrument of the characterization device includes light sources, the illumination means could for example use these same light sources. Hence, advantageously, when the measuring instrument is an optical microscope, the illumination means may comprise a white lamp, or a laser.

The illumination means 321, the splitting cube 325 and the first group of lenses 323 are herein arranged so that the optical axis 326 is perpendicular to the localization target 31.

The incident light (beam parallel to the optical axis 326), then reflected, scattered or diffracted by the localization target 31, may be advantageously used to make an image of a portion of the localization target 31.

For that purpose, the target imaging system 320 also comprises:
a second group 324 of optical lenses refracting the light reflected by the splitting cube 325, and
an optical imaging system 322 collecting the light refracted by the second doublet 324.

The optical imaging system 322 herein comprises a digital camera of the CMOS (Complementary Metal Oxide Semiconductor) type, with a planar array 322A of monochrome detectors.

FIG. 10 shows a detail view of the planar array 322A of detectors. The latter comprises a rectangular array of 640×

480 pixels 322B, with a period of 6 μm in the two directions along the lines and the columns of the array of detectors 322A.

The 640×480 pixels 322B of the array of detectors 322A are arranged regularly so that two orthogonal axes $X_{image}$ 322X and $Y_{image}$ 322Y can be defined as follow (see FIG. 10):

the axis $X_{image}$ 322X is oriented parallel to the lines of pixels of the array of detectors 322A, and the axis $Y_{image}$ 322Y is oriented parallel to the columns of pixels of the array of detectors 322A.

A image-reference system of the array of detectors 322A can then be defined by considering the first pixel 322D, located at the 1$^{st}$ line and the 1$^{st}$ column of the array of detectors 322A, as the origin of this image-reference system, the two orthogonal axes) $X_{image}$ 322X and $Y_{image}$ 322Y forming an orthogonal base of this image-reference system. It will be seen hereinafter that the orientation of the optical imaging system 322 in relation to the localization target 31 can be defined by means of the orthogonal axes $X_{image}$ 322X and $Y_{image}$ 322Y.

The array of detectors 322A finally comprises an image-centre 322C located at the centre thereof (see FIG. 10). It will be seen hereinafter that the position of the optical imaging system 322 in relation to the localization target 31 can be defined thanks to this image-centre 322C.

The optical imaging system 322 of the target imaging system 320 acquires an image 31P of at least one portion of the localization target 31, this image 310 being formed in the plane of the array of detectors 322A.

As the object field of the optical imaging system 322 does not cover herein all the localization target 31, the portion of the localization target 31 that is imaged by the optical imaging system 322 is (see FIG. 11) the portion delimited by the black rectangle showing the array of detectors 322A.

It can be seen in FIG. 11 that, on the one hand, the image-centre 322C of the array of detectors 322A is not located at the centre of the localization target 31 and that, on the other hand, neither of the orthogonal axes $X_{image}$ 322X and $Y_{image}$ 322Y is oriented in such a manner that they are parallel to one of the orthogonal axes $X_{mire}$ 11X or $Y_{mire}$ 11Y of the localization target 31.

Indeed, without any particular precaution about the arrangement of the target imaging system 320 in relation to the localization target 31 other than to suitably illuminate the latter, the optical imaging system 322 has any position and orientation in relation to the localization target 31.

To determine the position and orientation of the optical imaging system 322 in relation to the localization target 31, the positioning system 30 further includes image analysis means 33 that analyse the image 31P of the portion of the localization target 31 acquired by the optical imaging system 322.

It will be described hereinafter how the image analysis means 33 exploit the acquired image 31P as well as the particular information coded in the elementary cells 310 of the localization target 31 to perform this determination.

Figure 12:
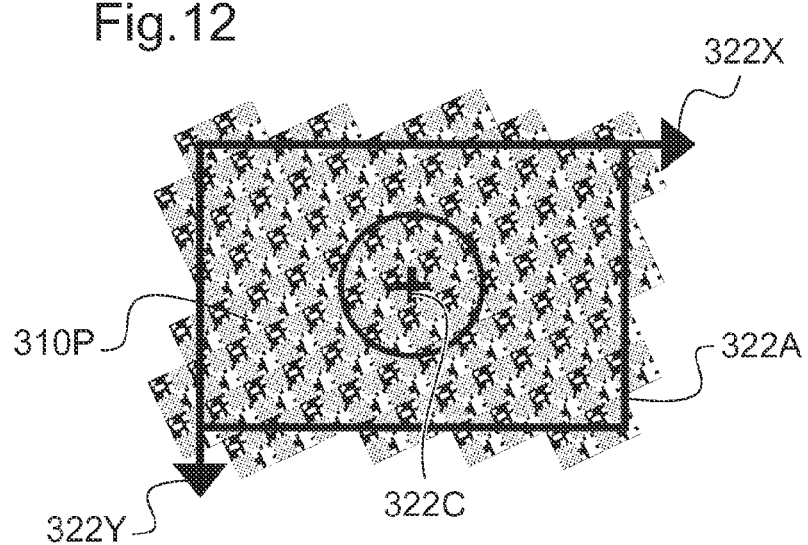
FIG. 12 is a detail view of FIG. 11 showing the array of detectors and the image of a portion of the localization target.

Determination of the Position and Orientation of the Optical Imaging System in Relation to the Localization Target In FIG. 12 is shown the image 31P of the portion of the localization target 31 acquired by the optical imaging system 322. This image 31P of the portion of the localization target 31 comprises the images 310P of several elementary cells 310 of the localization target 31.

In particular, the optical imaging system 322 is herein advantageously arranged so that the image 31P of the portion of the localization target 31 includes:

an image of a positioning pattern and an orientation pattern, an image of the periodic patterns forming sub-cells, and an image of an identification pattern.

The image 31P of the portion of the localization target 31 is analysed by the image analysing means 33 of the positioning system 30. By conventional shape recognition techniques, the image analysis means 33 identify all the orientation patterns present in the image 31P and determine the common orientation of each of them in relation to the two axes $X_{image}$ 322X and $Y_{image}$ 322Y.

Figure 13:
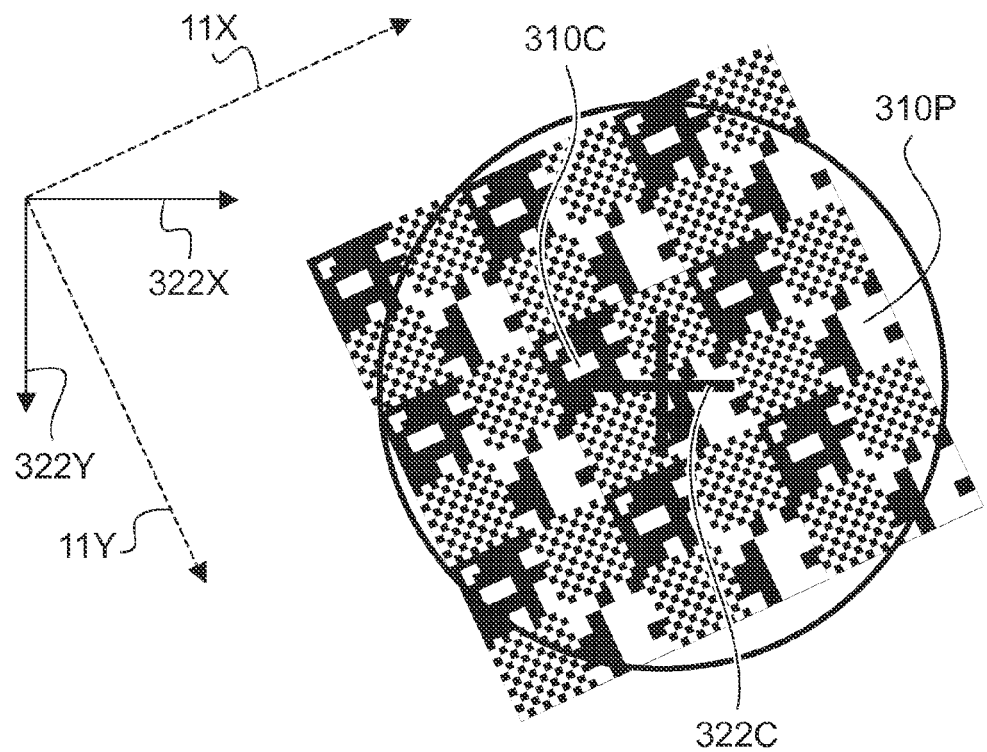
FIG. 13 is a detail view of FIG. 12 showing the image of a few elementary cells and the reference systems of the array of detectors and of the localization target.

This may be understood thanks to FIG. 13, in which is represented an enlarged view of the image 31P of the portion of the localization target 31 in the area defined by the black circle in FIG. 12. In FIG. 13 is also shown the two orthogonal axes $X_{image}$ 322X and $Y_{image}$ 322Y attached to the array of detectors 322A of the optical imaging system 322.

Based on the identification of the orientation patterns, the image analysis means 33 determine that the localization target 31 is oriented according to the two other orthogonal axes $X_{mire}$ 11X and $Y_{mire}$ 11Y, as shown in FIG. 13.

The image analysis means 33 hence determine that:

the optical imaging system 322 is oriented according to the two orthogonal axes $X_{image}$ 322X and $Y_{image}$ 322Y, and the localization target 31 is oriented according to the two orthogonal axes $X_{mire}$ 11X and $Y_{mire}$ 11Y.

Hence, by comparison, the image analysis means 33 determine the orientation of the optical imaging system 322 in relation to the localization target 31.

In the case shown in FIG. 13, this relative orientation may be, for example, quantified in simple manner by the measurement of the angle oriented between the axis $X_{image}$ 322X and the axis $X_{mire}$ 11X.

Likewise, the image analysis means 33 determine the position of the optical imaging system 322 in relation to the localization target 31. For that purpose, the image analysis means 33 determine the position of the image-centre 322C thanks to the analysis of the image 31P of the portion of the localization target 31.

The image analysis means 33 identify in particular the central elementary cell 310C containing the image centre 322C. The image analysis means 33 then decode the positioning pattern of the central elementary cell 310C so as to determine a first positioning of the image-centre 322 in relation to the localization target 31.

The image analysis means 33 also identify by shape recognition the positioning pattern of the central elementary cell 310C and deduce therefrom the values of the first binary number that codes for the position of the central elementary cell 310C according to the axis 11X and of the second binary number that codes for the position of the central elementary cell 310C according to the axis 11Y.

The image analysis means 33 then determine a second positioning of the image-centre 322 in relation to the localization target 31. This second, more accurate, positioning is made by means of the sub-cells including the periodic draughtboard patterns of the central elementary cell 310C.

Indeed, by conventional image processing techniques, the image analysis means 33 allow a sub-pixel positioning of these sub-cells, i.e., for example, the position of each of these sub-cells is determined with an accuracy better than $\frac{3}{100}^{th}$ of a pixel. For that purpose, the magnification of the target imaging system 320 is chosen so that each square of the draughtboards covers a surface equivalent to about six to twelve pixels.

Hence, the periodic patterns of the sub-cells allow to improve the accuracy of the positioning of the image-centre 322C in relation to the localization target 31.

That way, these periodic patterns allow to improve the accuracy of the positioning of the optical imaging system 322 in relation to the sample 11.

To sum-up, the image analysis means 33 determine from the image 31P of a portion of the localization target 31:
- the orientation of the optical imaging system 322 in relation to the localization target 31 thanks to the identification of the orientation patterns of the different elementary cells 310 present in the image 31P, and
- the position of the optical imaging system 322 in relation to the localization target 31 thanks to the reading of the positioning pattern of the central elementary cell 310C and to the sub-pixel positioning of the sub-cells of the central elementary cell 310C that comprise periodic patterns.

The different embodiments of the characterization device described hereinafter all include a positioning system that comprises a localization target 31 and image acquisition and analysis means such that those described hereinabove.

1st Embodiment

In the first embodiment shown in FIG. 2, the characterization device 10 includes a measuring instrument that is a digital optical microscope 20.

According to the invention, the measuring instrument 20 and the optical imaging system 322 are integral with each other. It is meant by this that there exists a mechanical coupling between them, i.e. any displacement of the measuring instrument 20 in a plane substantially parallel to the sample 11 causes an identical displacement of the optical imaging system 322 in relation to the sample 11.

This is shown in FIG. 2 by the full line 12 between the optical microscope 20 and the target imaging system 320 of the positioning system 30.

Advantageously, the optical imaging system 322 is herein arranged at the place of the condenser of the optical microscope 20.

The digital optical microscope 20 moreover comprises:
- a ×10 magnification lens 21 allowing to image a portion of the area of interest 11C of the sample 11, and
- a digital camera 22 allowing to acquire an image of the portion of the area of interest 11C.

It will be considered herein that the measuring instrument 20 determines the optical contrast of the sample 11 on the area of interest 11C. During a single measurement, the optical contrast of the sample 11 is measured over an extended area substantially centred about a localized measurement point. This localized measurement point is herein the image-centre 322C of the image 31P acquired by the digital optical microscope 20.

The measuring instrument 20 also comprises image processing means 23 allowing to determine the optical contrast on the whole digital image of a portion of the area of interest 11C of the sample 11 that is acquired by the digital camera 22. The image processing means 23 determine in particular the optical contrast at the localized measurement point of the sample 11.

Hence, the characterization device 10 includes:
- a measuring instrument 20 allowing to determine the optical contrast of the sample 11 at a localized measurement point of the sample 11, and
- a positioning system 30 allowing to determine the position and orientation of the optical imaging system 322 in relation to the localization target 31, and hence in relation to the sample 11 that is integral therewith.

Furthermore, to determine the relative position of the measuring instrument 20 in relation to the optical imaging system 322, the positioning system 30 of the characterization device 10 also includes calibration means.

These calibration means first comprise a thin glass slide 34 such as those conventionally used in optical microscopy. This glass slide 34 comprises a calibration target 34A engraved on the upper face of the glass slide 34 by conventional techniques of photolithography allowing to reach sub-micron engraving resolutions.

The calibration target 34A has advantageously a structure similar to the localization target 31 fixed on the sample 11. Preferably, the calibration target 34A is semi-transparent: for example, patterns appearing black are opaque on a background at least partially transparent.

Figure 14:
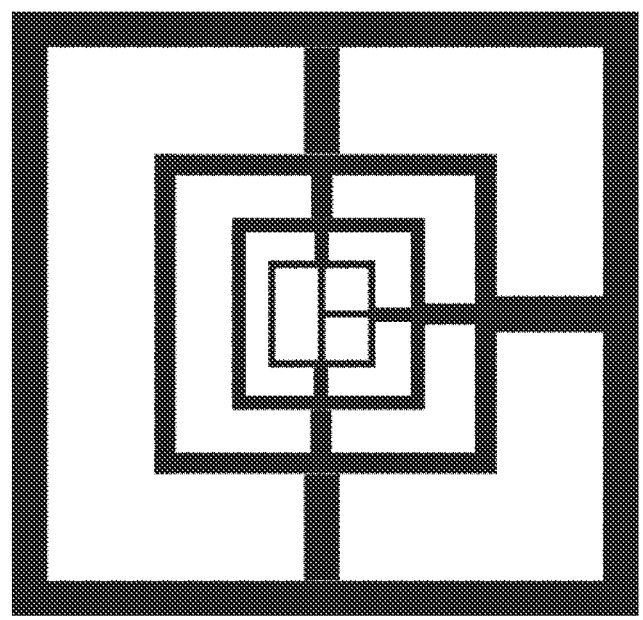
FIG. 14 shows a schematic view of an example of calibration target that can be used during the step of calibration of a characterization device.

As a variant, the calibration target could for example comprise a multi-scale multimodal tag as shown in FIG. 14. It is a self-similar structure, having no symmetry of rotation and observable by several instrumental techniques. Such a calibration target may be made by metal deposition on a glass slide, providing it with, on the one hand, a sufficient contrast to be observed by optical microscopy with different magnifications and by electron microscopy, and on the other hand, a topographic structure observable by means of an atomic force microscope. The position of this tag may be accurately known either because it belongs to the location pattern and has been manufactured simultaneously with the latter, in this case, it may for example replace the identification pattern of a known elementary cell; or because it is deposited lately on a support including a calibration target and its position is measured by means of an already-calibrated measuring instrument, for example a low-magnification digital optical microscope.

Figure 15:
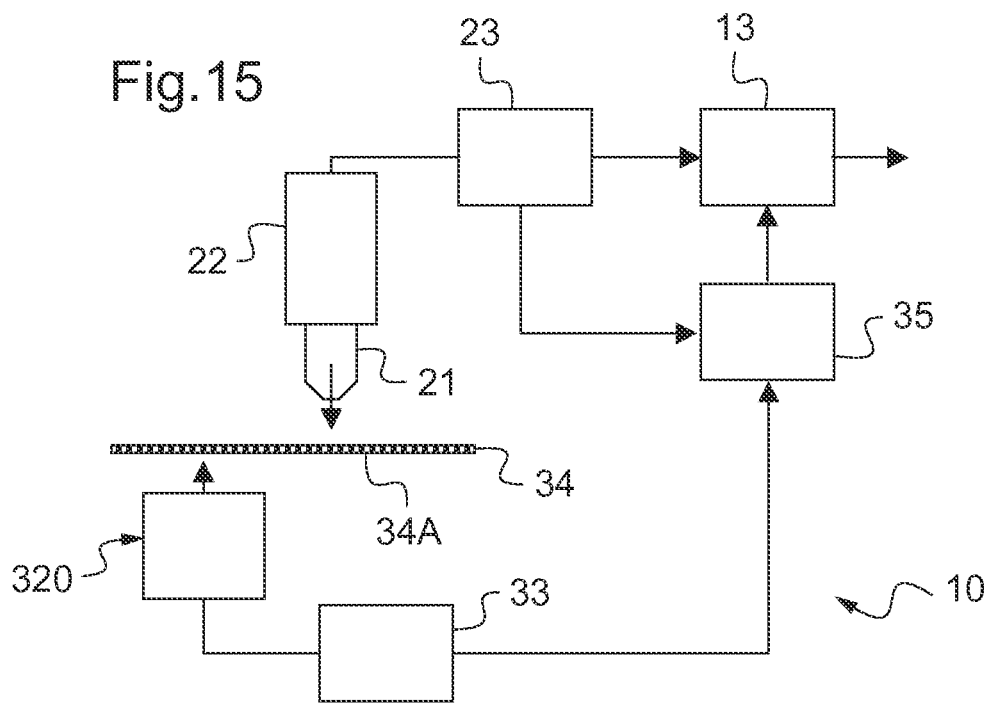
FIG. 15 shows a schematic view of the characterization device of FIG. 1 during the step of calibration.

During a step of calibration, the glass slide 34 is arranged in the characterization device 10 in the same way as the sample 11. This situation is shown in FIG. 15.

The glass slide 34 hence deposited on the characterization device 10, the calibration target 34A can be observed simultaneously by both sides and imaged from above by the digital optical microscope 20 and from below by the target imaging system 320.

On one side, the image analysis means 33 of the positioning system 30 determine, in the same way as the localization target 31, the position and orientation of the optical imaging system 322 in relation to the calibration target 34A, i.e. in a referential system linked to the calibration target 34A.

On the other side, the image processing means 23 of the measuring instrument 20 determine, also in the same way, the position and orientation of the measuring instrument 20 in relation to the calibration target 34A, i.e. in the same referential system linked to the calibration target 34A.

As a variant, if a multi-scale multimodal tag is used, it is advisable to observe it by means of the measuring instrument. The conventional image processing techniques then allow to determine its exact position and orientation.

The calibration means also comprise data processing means 35 to which are transmitted:

by the image analysis means 33: the position and orientation of the optical imaging system 322 in the referential system linked to the calibration target 34A, and by the image processing means 23: the position and orientation of the measuring instrument 20 in the referential system linked to the calibration target 34A.

The data processing means 35 then determine the relative position of the measuring instrument 20 in relation to the optical imaging system 322. This relative position corresponds to the vector shift in the referential system linked to the optical imaging system 322 between the localized measurement point of the calibration target 34A observed by the measuring instrument 20 and the image-centre 322C of the optical imaging system 322.

The data processing means 35 comprise data storage means allowing to record this relative position so that the latter can be lately exploited by the characterization device 10.

To better understand the operation of the first embodiment of the characterization device 10, the characterization method according to the invention allowing to characterize the silicon wafer 11 constituting the sample will now be described.

Characterization Method a) Calibration

An operator places the calibration target 34 in the characterization device 10, so that it can observed it on its both faces, on one side by the optical microscope 20 and on the other side by the optical imaging system 322.

The optical microscope 20 acquires a first image of a portion of the calibration target 34 that is processed by the image processing means 23 to determine the position and orientation of the optical microscope 20 in relation to the calibration target 34A.

The optical imaging system 322 acquires a second image of a portion of the calibration target 34 that is analysed by the image analysis means 33 to determine the position and orientation of the optical imaging system 322 in relation to the calibration target 34A.

The data processing means 35 then determine the relative position of the optical microscope 20 in relation to the optical imaging system 322.

b) Setting of the Sample

The operator gets the silicon wafer 11 to be characterized and fixes the localization target 31 by adhesive on the lower face 11B of the silicon wafer 11. The localization target 31 is hence made integral with the sample 11. The localization target 31 is of the type of that shown in FIG. 4. By these patterns, this localization target 31 defines a referential system linked to the sample 11.

Then, the operator places the silicon wafer 11 in the characterization device 10 for the measurement. The optical microscope 20 acquires an image of a portion of the area of interest 11C of the silicon wafer, the image being centred at the localized measurement point. This image of the portion of the area of interest 11C is processed by the image processing means 23, which then determine the value of the optical contrast of the sample 11 at the localized measurement point.

c) Acquisition of an Image of the Localization Target

The target imaging system 320 illuminates the localization target 31 thanks to the illumination means 321 and the optical imaging system 322 acquires an image of at least one portion of the localization target 31.

d) Analysis of the Acquired Image

The image previously acquired by the optical imaging system 322 is analysed by the image analysis means 33, which then determine the position and orientation of the optical imaging system 322 in relation to the localization target 31.

e) Determination of the Position of the Measurement Point

The image analysis means 33 transmit to the data processing means 35 the position and orientation of the optical imaging system 322 in relation to the localization target 31, i.e. in the referential system linked to the silicon wafer 11.

The characterization device 10 further includes means 13 for processing the results of the image analysis and of the calibration to which are transmitted, on the one hand, the result of the measurement of the optical contrast at the localized measurement point by the image processing means 23, and on the other hand, the relative position of the optical microscope 20 in relation to the optical imaging system 322 by the data processing means 35.

The means 13 for processing the results of the image analysis and of the calibration then deduce therefrom the absolute position of the localized measurement point in the referential system linked to the sample 11.

Hence, the operator of the characterization device 10 knows at the end of the characterization procedure:

the value of the optical contrast of the sample 11 at the localized measurement point, and the absolute position of the localized measurement point in a referential system linked to the sample 11.

$2^{nd}$ Embodiment

In FIG. 16 is shown a second embodiment of the characterization device 110 according to the invention.

In this second embodiment, the characterization device 110 first includes a first measuring instrument 120A (see dashes in FIG. 16) comprising a rotary plate 124, a first ×10 magnification lens 121A fixed on the rotary plate 124, a digital camera 122, and image processing means 123.

The characterization device 110 also includes a second measuring instrument 120B (see dashes in FIG. 16). This second measuring instrument 120B shares with the first measuring instrument 120A the rotary plate 124, the digital camera 122 and the image processing means 123.

The second measuring instrument 120B moreover includes a second ×50 magnification lens 121B fixed on the rotary plate 124.

The rotary plate 124 is able to rotate in its plane, which allows the operator using the characterization device 110 to select which object to use during a measurement.

In this second embodiment, the characterization device 110 includes a positioning system 30 identical to that of the first embodiment and operating in the same manner to determine the position of the optical imaging system 322 in relation to the calibration target 31 integral with the sample 11.

An operator wishing to study the sample 11 by means of the first and second measuring instruments 120A, 120B equipped with the two lenses 121A, 121B, respectively, for example to perform a measurement located at the same localized measurement point of the sample 11, will implement twice the characterization method described above for the first embodiment.

Advantageously, the operator will be able to carry out the steps of calibration of the two lenses 121A and 121B one after the other, before performing the successive measurements by means of these two lenses 121A, 121B.

In the case where the optical axes between the two lenses 121A, 121B are shifted by a few tens of micrometers, the same calibration procedure could no longer be performed, the field of view of the digital camera 122 of the measuring instruments 120A, 120B being then too reduced.

The calibration may be performed with the same calibration sample (the glass slide of FIG. 15, with its calibration target), by taking care of having in the field of view of the digital camera an image of the calibration target where the orientation pattern is visible. By acquiring and recording an image coming from the digital camera of the optical microscope, the orientation pattern is searched (manually or automatically) and its relative position in relation to the centre of the image, as well as its orientation, are determined. By making the hypothesis of being still in the same area of the calibration target, whose absolute position has been determined during the first calibration, it is possible to go back to the absolute position and to the orientation of the field of view of the high-magnification optical microscope.

As a variant, the multi-scale multimodal tag described hereinabove (see FIG. 14) may be used. In this case, it is no longer necessary to suppose a small shift between the different lenses of the optical microscope.

It may hence be advantageous to arrange the target imaging system in such a manner that its centre of observation, i.e. the image-centre of the optical imaging system coincides with or is close enough to the measurement point of the measuring instrument or of the centre of its field of observation.

3$^{rd}$ Embodiment

In FIG. 17 is shown a third embodiment of the characterization device 210 according to the invention.

In this third embodiment, the characterization device 210 includes two measuring instruments: a digital optical microscope 20 and an atomic force microscope 220 (called hereinafter AFM).

The digital optical microscope 20 is identical to that used in the first embodiment (see FIG. 2): it includes a lens 21, a digital camera 22 and image processing means 23 to process the images acquired by the digital camera 22.

The AFM 220 comprises a tip 221, an amplifier 222 and signal processing means 223 processing the signal exiting from the amplifier 222. The AFM also comprises a visualisation device 224 allowing to acquire an image of the area explored by the tip 221 of the AFM 220. The visualisation device 224 herein comprises a video camera providing an image of the sample 11 under a low magnification.

In this third embodiment, the positioning system 230 of the characterization device 210 comprises:
- a first target imaging system 320, comprising a first optical imaging system (not shown) and associated with first image analysis means 33;
- a second target imaging system 2320, comprising a second optical imaging system (not shown) and associated with the second image analysis means 233.

Although it is not schematized in FIG. 17, in this third embodiment, on the one hand, the first optical imaging system is integral with the digital optical microscope 20 and, on the other hand, the second optical imaging system is integral with the AFM 220.

The first and second target imaging systems 320, 2320, associated with the first and second image analysis means 33, 233, respectively, operate in the same way as for the two preceding embodiments.

In particular, during a step of calibration or a step of measurement, they determine and transmit to the data processing means 35 the position and orientation of the first and second optical imaging systems in relation to the target they observe (a calibration target during a calibration and a localization target during a measurement).

In this third embodiment, the procedure of calibration of the positioning system 30 is performed separately with each of the two target imaging systems 320, 2330, so as to determine, on the one hand, the relative position of the first measuring instrument 20 in relation to the first optical imaging system, and on the other hand, the relative position of the second measuring instrument 220 in relation to the second optical imaging system.

In particular, the calibration of the tip 221 is performed in the same manner as that of a high-magnification optical lens (see the 2$^{nd}$ embodiment). An AFM topographic measurement of the surface of a calibration sample, such as the glass slide provided with its calibration target, is performed, so as to find the position and orientation of the orientation pattern.

In the case of an atomic force microscope, by proceeding in the same manner as in the case of a digital optical microscope, it may hence be proceeded to the calibration of the visualisation device 224.

In an alternative embodiment, the calibration means for the atomic force microscope and for the optical microscope may be different.

Once the calibration of each of the measuring instruments 20, 220 terminated, the characterization device 210 may proceed to the measurements on the sample 11.

Thanks to this third embodiment, it is possible to study the silicon wafer 11 by means of two very different measuring instruments. It is in particular possible to characterize this sample 11 at a same localized measurement point by two different techniques.

To sum up, the characterization devices are all equipped with an optical imaging system that observes permanently a localization target integral with the studied sample. By interpreting the image of the localization target, the positioning system allows to deduce the absolute position of the observation location in the reference system of the sample it-self. The positioning system allows to reproduce the observation point when the sample is transferred from one measuring instrument to one another or when successive observations are performed with the same measuring instrument, but separated in time.

An advantage of the invention is to make so that measurements at the nanometer scale are co-localizable for a great variety of measuring instruments.

The invention claimed is:

1. A device (1, 10, 110, 210) for characterizing a sample (11) comprising:
    a measuring instrument (2, 20, 120, 220) adapted to determine a physical characteristic of said sample (11) at one point of said sample (11); and
    a positioning system (3, 30, 230) adapted to position said measuring instrument (2, 20, 120, 220) in relation to said sample (11) to be characterized, at one localized measurement point of said sample (11),
    wherein said positioning system (3, 30, 230) comprises:
    a localization target (31) made integral with said sample (11) and defining a referential system linked to said sample (11), image acquisition and analysis means including:
means (321) for illuminating said localization target (31),
an optical imaging system (322), integral with said measuring instrument (2, 20, 120, 220), adapted to acquire an image (31P) of at least one portion of said localization target (31), and
image analysis means (33) adapted to analyse the image (31P) of said portion of the localization target (31) to determine the position and orientation of said optical imaging system (322) in relation to said localization target (31),
calibration means (34, 34A) adapted to determine the relative position of said measuring instrument (2, 20, 120, 220) in relation to said optical imaging system (322), and
means (13) for processing the results of the image analysis and of the calibration, adapted to determine the absolute position of said localized measurement point in said referential system linked to said sample (11), said measuring instrument (2, 20, 120, 220) being positioned for the measurement at said localized measurement point and said physical characteristic of said sample (11) being determined by said measuring instrument (2, 20, 120, 220) at said localized measurement point, and
wherein the characterization device (110) includes another measuring instrument (120) adapted to determine another physical characteristic of said sample (11) at one point of said sample (11), said positioning system (30) being adapted to position said other measuring instrument (120) in relation to said sample (11) at a second localized measurement point of said sample (11), said optical imaging system (322) being also integral with said other measuring instrument (120), said calibration means (34, 34A) of said positioning system (30) being adapted to determine the relative position of said measuring instrument (120) in relation to said optical imaging system (322), and said result processing means (13) being adapted to determine the absolute position of said second localized measurement point in said referential system linked to said sample (11), said other physical characteristics of said sample (11) being determined by said other measuring instrument (120) at said second measurement point.

2. A device (1, 10, 110, 210) for characterizing a sample (11) comprising:
a measuring instrument (2, 20, 120, 220) adapted to determine a physical characteristic of said sample (11) at one point of said sample (11); and
a positioning system (3, 30, 230) adapted to position said measuring instrument (2, 20, 120, 220) in relation to said sample (11) to be characterized, at one localized measurement point of said sample (11),
wherein said positioning system (3, 30, 230) comprises:
a localization target (31) made integral with said sample (11) and defining a referential system linked to said sample (11),
image acquisition and analysis means including:
means (321) for illuminating said localization target (31),
an optical imaging system (322), integral with said measuring instrument (2, 20, 120, 220), adapted to acquire an image (31P) of at least one portion of said localization target (31), and
image analysis means (33) adapted to analyse the image (31P) of said portion of the localization target (31) to determine the position and orientation of said optical imaging system (322) in relation to said localization target (31),
calibration means (34, 34A) adapted to determine the relative position of said measuring instrument (2, 20, 120, 220) in relation to said optical imaging system (322), and
means (13) for processing the results of the image analysis and of the calibration, adapted to determine the absolute position of said localized measurement point in said referential system linked to said sample (11), said measuring instrument (2, 20, 120, 220) being positioned for the measurement at said localized measurement point and said physical characteristic of said sample (11) being determined by said measuring instrument (2, 20, 120, 220) at said localized measurement point, and
wherein the characterization device (110) includes another measuring instrument (220) adapted to determine another physical characteristic of said sample (11) at one point of said sample (11), said positioning system (230) being adapted to position said other measuring instrument (220) in relation to said sample (11) at a second localized measurement point of said sample (11) and comprising another optical imaging system (2322), integral with said other measuring instrument (220), adapted to acquire another image of at least one portion of said localization target (31), said image analysis means (233) being adapted to analyse said other image of the portion of said localization target (31) to determine the position and orientation of said other optical image system (2322) in relation to said localization target (31), said calibration means (34, 34A) of said positioning system (230) being adapted to determine the relative position of said other measuring instrument (220) in relation to said other optical imaging system (2322), and said result processing means (13) being adapted to determine the absolute position of said second localized measurement point in said referential system linked to said sample (11), said other physical characteristic of said sample (11) being determined by said other measuring instrument (220) at said second measurement point.

3. A device (1, 10, 110, 210) for characterizing a sample (11) comprising:
a measuring instrument (2, 20, 120, 220) adapted to determine a physical characteristic of said sample (11) at one point of said sample (11); and
a positioning system (3, 30, 230) adapted to position said measuring instrument (2, 20, 120, 220) in relation to said sample (11) to be characterized, at one localized measurement point of said sample (11),
wherein said positioning system (3, 30, 230) comprises:
a localization target (31) made integral with said sample (11) and defining a referential system linked to said sample (11),
image acquisition and analysis means including:
means (321) for illuminating said localization target (31),
an optical imaging system (322), integral with said measuring instrument (2, 20, 120, 220), adapted to acquire an image (31P) of at least one portion of said localization target (31), and
image analysis means (33) adapted to analyse the image (31P) of said portion of the localization target (31) to determine the position and orientation of said optical imaging system (322) in relation to said localization target (31), calibration means (34, 34A) adapted to determine the relative position of said measuring instrument (2, 20, 120, 220) in relation to said optical imaging system (322), and means (13) for processing the results of the image analysis and of the calibration, adapted to determine the absolute position of said localized measurement point in said referential system linked to said sample (11), said measuring instrument (2, 20, 120, 220) being positioned for the measurement at said localized measurement point and said physical characteristic of said sample (11) being determined by said measuring instrument (2, 20, 120, 220) at said localized measurement point, and wherein the characterization device (110) includes another measuring instrument (220) adapted to determine another physical characteristic of said sample (11) at one point of said sample (11), said positioning system (230) being adapted to position said other measuring instrument in relation to said sample (11) at a second localized measurement point of said sample (11) and comprising:

another optical imaging system (2322), integral with said other measuring instrument (220), adapted to acquire another image of at least one portion of said localization target (31), said image analysis means (233) being adapted to analyse said other image of the portion of the localization target (31) to determine the position and orientation of said other optical imaging system (2322) in relation to said localization target (31), and other calibration means adapted to determine the relative position of said other measuring instrument (220) in relation to said other optical imaging system (2322), said result processing means (13) being adapted to determine the absolute position of said second localized measurement point in said referential system linked to said sample (11), said other physical characteristic of said sample (11) being determined by said other measuring instrument (220) at said second measurement point.

4. The characterization device (1, 10, 110, 210) according to claim 1, wherein said localization target (31) is engraved on or in the sample (11) through mechanical or photolithographic techniques, or is printed on the sample (11) by inking or serigraphy.

5. The characterization device (1, 10, 110, 210) according to claim 1, wherein said localization target (31) comprises a flexible or rigid support added on the sample (11) to make said support integral with said sample (11).

6. The characterization device (1, 10, 110, 210) according to claim 1, wherein said localization target (31) includes micro- or nanostructured patterns.

7. The characterization device (1, 10, 110, 210) according to claim 1, wherein said localization target (31) is formed of a plurality of elementary cells (310) forming a regular two-dimensional pavement.

8. The characterization device (1, 10, 110, 210) according to claim 7, wherein each elementary cell (310) includes:
a positioning pattern (3101A2) indicating the position of said elementary cell (310) in said referential system linked to said sample (11), and
an orientation pattern (3101A1) indicating the orientation of said elementary cell (310) in said referential system linked to said sample (11).

9. The characterization device (1, 10, 110, 210) according to claim 4, wherein said localization target (31) includes micro- or nanostructured patterns.

10. The characterization device (1, 10, 110, 210) according to claim 5, wherein said localization target (31) includes micro- or nanostructured patterns.

11. The characterization device (1, 10, 110, 210) according to claim 6, wherein said localization target (31) is formed of a plurality of elementary cells (310) forming a regular two-dimensional pavement.

12. The characterization device (1, 10, 110, 210) according to claim 9, wherein said localization target (31) is formed of a plurality of elementary cells (310) forming a regular two-dimensional pavement.

13. The characterization device (1, 10, 110, 210) according to claim 10, wherein said localization target (31) is formed of a plurality of elementary cells (310) forming a regular two-dimensional pavement.

14. The characterization device (1, 10, 110, 210) according to claim 11, wherein each elementary cell (310) includes:
a positioning pattern (3101A2) indicating the position of said elementary cell (310) in said referential system linked to said sample (11), and
an orientation pattern (3101A1) indicating the orientation of said elementary cell (310) in said referential system linked to said sample (11).

15. The characterization device (1, 10, 110, 210) according to claim 12, wherein each elementary cell (310) includes:
a positioning pattern (3101A2) indicating the position of said elementary cell (310) in said referential system linked to said sample (11), and
an orientation pattern (3101A1) indicating the orientation of said elementary cell (310) in said referential system linked to said sample (11).

16. The characterization device (1, 10, 110, 210) according to claim 13, wherein each elementary cell (310) includes:
a positioning pattern (3101A2) indicating the position of said elementary cell (310) in said referential system linked to said sample (11), and
an orientation pattern (3101A1) indicating the orientation of said elementary cell (310) in said referential system linked to said sample (11).

17. The characterization device (10, 110) according to claim 1, for a substantially planar sample (11) including a first face (11A) and a second face (11B), wherein:
said measuring instrument (20, 120) includes an optical microscope that comprises a place intended to receive a condenser when said optical microscope is used in trans-illumination mode,
said localization target (31) is then made integral with said second face (11B) of said sample (11), said localized measurement point being located on said first face (11A) of said sample (11),
said optical imaging system (322) being arranged at the place of said condenser.

18. The characterization device (1, 10, 110, 210) according to claim 2, wherein said localization target (31) is engraved on or in the sample (11) through mechanical or photolithographic techniques, or is printed on the sample (11) by inking or serigraphy.

19. The characterization device (1, 10, 110, 210) according to claim 2, wherein said localization target (31) comprises a flexible or rigid support added on the sample (11) to make said support integral with said sample (11).

20. The characterization device (1, 10, 110, 210) according to claim 2, wherein said localization target (31) includes micro- or nanostructured patterns.

21. The characterization device (1, 10, 110, 210) according to claim 2, wherein said localization target (31) is formed of a plurality of elementary cells (310) forming a regular two-dimensional pavement.

22. The characterization device (10, 110) according to claim 2, for a substantially planar sample (11) including a first face (11A) and a second face (11B), wherein:
- said measuring instrument (20, 120) includes an optical microscope that comprises a place intended to receive a condenser when said optical microscope is used in trans-illumination mode,
- said localization target (31) is then made integral with said second face (11B) of said sample (11), said localized measurement point being located on said first face (11A) of said sample (11),
- said optical imaging system (322) being arranged at the place of said condenser.

23. The characterization device (1, 10, 110, 210) according to claim 3, wherein said localization target (31) is engraved on or in the sample (11) through mechanical or photolithographic techniques, or is printed on the sample (11) by inking or serigraphy.

24. The characterization device (1, 10, 110, 210) according to claim 3, wherein said localization target (31) comprises a flexible or rigid support added on the sample (11) to make said support integral with said sample (11).

25. The characterization device (1, 10, 110, 210) according to claim 3, wherein said localization target (31) includes micro- or nanostructured patterns.

26. The characterization device (1, 10, 110, 210) according to claim 3, wherein said localization target (31) is formed of a plurality of elementary cells (310) forming a regular two-dimensional pavement.

27. The characterization device (10, 110) according to claim 3, for a substantially planar sample (11) including a first face (11A) and a second face (11B), wherein:
- said measuring instrument (20, 120) includes an optical microscope that comprises a place intended to receive a condenser when said optical microscope is used in trans-illumination mode,
- said localization target (31) is then made integral with said second face (11B) of said sample (11), said localized measurement point being located on said first face (11A) of said sample (11),
- said optical imaging system (322) being arranged at the place of said condenser.

* * * * *